UNITED STATES PATENT OFFICE.

WILLIAM WATT, OF BELFAST, IRELAND.

IMPROVEMENT IN STARCH FROM MAIZE.

Specification forming part of Letters Patent No. 17,710, dated June 30, 1857.

*To all whom it may concern:*

Be it known that I, WILLIAM WATT, of Belfast, in Ireland, a subject of the Queen of Great Britain, have invented new and useful Improvements in the Manufacture of Starch; and I do hereby declare that the following is a full, clear, and exact description thereof.

I take maize or Indian corn in the whole state, and I steep it in water at a temperature of about 120° of Fahrenheit's thermometer, or at any temperature between 70° and 140° of Fahrenheit's thermometer. The water may be fresh water, or water which has previously been used for the same purpose. The whole or unground corn is thus steeped for about a week, more or less, and the water is changed several times, or continuous or intermittent streams of water are applied, and the high temperature is maintained during the steeping. The grains of corn are thus swollen by the combined action of the water and the heat, and a certain amount of acid fermentation takes place, and the extraneous matter of the corn is thus so decomposed and dissolved or acted upon by the steep-water as to admit of the particles of the starch and the husks being easily separated. The swollen corn is then ground in millstones or otherwise, with a current of water at a temperature of from 70° to 140° Fahrenheit's thermometer; or cold water may be employed in the grinding, although with a less beneficial effect. The watery pulp or mixture thus produced is diluted, if necessary, with more hot or cold water, and it is passed through a sieve or sieves or strainers, such as are commonly used by starch-manufacturers by which means the husks and fibrous or extraneous matters are arrested, while the starch and water pass through the sieves. The starch is separated from the water by allowing it to subside by the ordinary processes and apparatus used by manufacturers of wheat-starch or other starch. A convenient apparatus for this purpose is that which is sometimes called a "run." It consists of an inclined plane or trough, which may be about eighteen inches wide and fifty feet long, and about five inches deep, and having an inclination or fall of about two or three inches in the fifty feet. These dimensions may however be varied. The starchy water is allowed to flow gently in a thin sheet down this inclined plane or trough. The starch settles upon the plane, while the water and the gluten and fibrous matters pass away at the lower end. When a considerable quantity of starch has collected the flow is stopped, and the starch is then removed by a shovel and thrown into a cistern, where it is stirred up with water and allowed to subside, and it is then placed in boxes and dried and packed in paper and stored in the usual manner.

The steeping operation is performed most rapidly and effectually when the water is used at a high temperature; but the temperature must not be so high as to cause the starch granules to burst and dissolve in the water. It is therefore advisable to keep the temperature somewhat below 140°, and I find that a temperature of 120° of Fahrenheit's thermometer, as hereinbefore mentioned, is a convenient and suitable temperature for the purpose. The water employed in grinding or levigating the steeped corn may be used cold; but I prefer to heat it, as hereinbefore mentioned.

By treating the maize in the whole state at a high temperature, as hereinbefore described, I am enabled to act upon and dissolve the requisite portion of the extraneous matter and to remove and change the steep-water without washing away the starch from the corn, whereas if the ground or crushed grain were placed in water a portion of it would be washed away if the water were changed, and, on the other hand, if the whole corn were placed in cold water there would be comparatively but little effect produced, owing to the hard or flinty nature of the maize. The soft condition into which the corn is brought by the use of the hot water in steeping and grinding causes it to yield a larger quantity of a superior quality of starch to that obtained by the ordinary processes. By this process it is unnecessary to employ alkalies or other chemical agents, and the ordinary process of fermenting the grain after crushing or grinding it is dispensed with.

The husks and fibrous matters may be employed at once in their moist state for feeding pigs and other animals, and are brought by the aforesaid process into a favorable state for assimilation.

Having now described the nature of the said invention and in what manner the same is to be performed, I wish it to be understood that what I claim is—

The manufacture of starch from maize or Indian corn, substantially in the manner hereinbefore set forth, by steeping the whole or uncrushed corn in water heated to a temperature of from 70° to 140° of Fahrenheit's thermometer, such water being changed several times during the steeping, or applied in continuous or intermittent streams, and then grinding or levigating it with water heated to a temperature of from 70° to 140° of Fahrenheit's thermometer, and then separating the starch, as hereinbefore described.

WILLIAM WATT.

In presence of—
CHARLES COWPER,
    20 *Southampton Buildings, Chancery Lane, London.*
JOHN R. DANKER.
    *Consulate U. S. A., London.*